(12) United States Patent
Cai et al.

(10) Patent No.: US 7,723,426 B2
(45) Date of Patent: May 25, 2010

(54) SHELF-STABLE SILANE-MODIFIED AQUEOUS DISPERSION POLYMERS

(75) Inventors: Weizhen Cai, Tucker, GA (US); William B. Herdle, Briarcliff Manor, NY (US); Jeffrey A. Cooke, Etobicoke (CA); Bruce A. Waldman, Cortlandt Manor, NY (US)

(73) Assignee: Momentive Performance Materials Inc., Albany, NY (US)

( * ) Notice: Subject to any disclaimer, the term of this patent is extended or adjusted under 35 U.S.C. 154(b) by 0 days.

(21) Appl. No.: 10/881,450

(22) Filed: Jun. 30, 2004

(65) Prior Publication Data

US 2005/0059775 A1  Mar. 17, 2005

Related U.S. Application Data

(63) Continuation of application No. 10/463,897, filed on Jun. 17, 2003.

(51) Int. Cl.
*C08L 83/00* (2006.01)
*C08F 2/16* (2006.01)
*C08F 230/08* (2006.01)

(52) U.S. Cl. .................. 524/506; 524/804; 524/806
(58) Field of Classification Search .............. 524/506, 524/804, 806

See application file for complete search history.

(56) References Cited

U.S. PATENT DOCUMENTS

| | | | |
|---|---|---|---|
| 3,575,910 A | 4/1971 | Thomas | |
| 3,706,697 A | 12/1972 | Backderf | |
| 3,729,438 A | 4/1973 | Plesich et al. | |
| 3,814,716 A | 6/1974 | Kowalski et al. | |
| 4,716,194 A | 12/1987 | Walker et al. | |
| 5,214,095 A | 5/1993 | Lavoie | |
| 5,482,994 A | 1/1996 | Liles et al. | |
| 5,599,597 A | 2/1997 | Berg et al. | |
| 5,686,523 A * | 11/1997 | Chen et al. | 524/547 |
| 5,840,800 A * | 11/1998 | Joffre et al. | 524/806 |
| 5,932,651 A | 8/1999 | Liles et al. | |
| 5,994,428 A | 11/1999 | Lutz et al. | |
| 6,130,287 A | 10/2000 | Krishnan | |
| 6,258,460 B1 * | 7/2001 | Phan et al. | 428/447 |
| 6,287,701 B1 * | 9/2001 | Oochi et al. | 428/447 |

FOREIGN PATENT DOCUMENTS

| | | |
|---|---|---|
| EP | 0327376 A2 | 2/1989 |
| EP | 0327376 B1 | 2/1989 |
| EP | 0327376 B2 | 2/1989 |
| EP | 0771826 A | 5/1997 |
| EP | 98/35994 | 2/1998 |
| GB | 1407827 | 8/1972 |

OTHER PUBLICATIONS

Cooke et al., Hydrolysis Studies of Silane Crosslinkers in Latexes, Presented at Silicones in Coatings IV, Guildford, UK, May 30-31, 2002, pp. 1-18.
Chen et al., Silanes in Coatings Technology, Journal of the Oil and Colour Chemists' Association, vol. 79, Dec. 1996, pp. 539-550.
Cai et al., Emulsion Polymerisation with Hindered Silane Monomers, Presented at Silicones in Coatings III, Barcelona, Spain, Mar. 28-30, 2000, pp. 1-13.
Marcu et al., Incorporation of Alkoxysilanes into Model Latex Systems: Vinyl Copolymerization of Vinyltriethoxysilane and n-butyl Acrylate, Macromolecules, vol. 36, 2003, pp. 328-332.
Bourne et al., Feasibility of Using Alkoxysilane-Functional Monomers for the Development of Crosslinkable Emulsions, Journal of Coatings Technology, vol. 54, Jan. 1982, pp. 69-82.

* cited by examiner

*Primary Examiner*—William K Cheung
(74) *Attorney, Agent, or Firm*—Dominick G. Vicari; Joseph S. Ostroff

(57) ABSTRACT

Disclosed herein is a process for preparing a shelf-stable, one-pack, silane modified (meth)acrylic latex interpolymer composition, wherein the process comprises continuously adding at least a portion of a mixture comprising at least 0.5 mole percent of a vinyl silane comprising hydrolyzable groups and up to 99.5 mole percent of a (meth)acrylic monomer to water and a surfactant in a reaction vessel, wherein said addition is carried out in the presence of a polymerization initiator and buffer sufficient to maintain the pH of the reaction at a level of at least 6 throughout the reaction, while simultaneously hydrolyzing from about 10 to about 60% of the hydrolyzable groups of the vinyl silane.

11 Claims, No Drawings

SHELF-STABLE SILANE-MODIFIED AQUEOUS DISPERSION POLYMERS

CROSS-REFERENCE TO RELATED APPLICATION

This is a continuation-in-part of U.S. patent application Ser. No. 10/463,897, filed Jun. 17, 2003.

FIELD OF THE INVENTION

The present invention relates to (meth)acrylic latex copolymers and processes to manufacture thereof.

BACKGROUND OF THE INVENTION

As employed herein, the terminology "(meth)acrylic" is intended to mean "acrylic or methacrylic".

There is extensive prior art on free radical copolymerization of unsaturated silanes with organic comonomers, in solvent-borne systems as well as in waterborne systems. Although not completely absent, shelf life problems and problems due to high levels of silane incorporation are not of overriding importance in non-aqueous systems. In waterborne systems, most of the art ignores shelf life issues, or does not attempt to provide long shelf lives, particularly when higher concentrations of silanes are involved. For specialized applications, these systems can be used shortly after synthesis.

Aqueous dispersion polymers (commonly, latex, latexes, latices) are well known. Some general references include:

*Waterborne and Solvent Based Acrylics and their End user Applications*, ed. P. Oldring and P. Lam, Volume 1 of Surface Coatings Technology, John Wiley and Sons, New York, 1997, especially chapter II, and;

*Resins for Surface Coatings, Volume I, Acrylics and Epoxies*, H. Coyard, P. Deligny and N. Tuck, John Wiley and Sons, New York, 2001.

In these references typical synthesis conditions, initiator techniques, comonomers, end use properties and application conditions are described.

Latexes can be provided with superior properties for use in coatings, sealants, and adhesives by incorporation of organo-functional alkoxy silanes in the polymer. The superior properties include resistance to common household chemicals and to solvents, as well as resistance of latex paints to scrubbing with household cleaning agents. In sealants, a sealant that can be obtained that produces joints that are resistant to the environment, are flexible, and do not flow after curing in place. These properties arise from the cross-linking of the polymer chains in the latex after application and flow out or coalescence of the latex. Inclusion of silanes provides an effective mechanism for creating "self-cross-linkable" latex polymers, which do not need the addition of a separate cross-linking agent—that is, they are "one pack" systems, not "two pack" systems. There are also chemistries that do not involve silicon-containing comonomers that achieve some of the benefits of one pack, self-cross-linkable latex systems. Silicon (silane) based technologies offer superior resistance to degradation by UV light and the environment, compared to most other technologies.

This technology—based on alkoxysilane comonomers—has been practiced to some degree for years in a limited number of latex applications. However, there are deficiencies in what has been achieved to date, particularly with regard to combining good stability and good low temperature cure.

First—alkoxy silanes are reactive with water. Hydrolysis of the alkoxy groups attached to silicon, such as methoxy or ethoxy groups, occurs readily and produces free alcohol, such as methanol or ethanol. Remaining on the silicon atom after hydrolysis is an —OH group, viz., a silanol. The condensation of two silanols to form an Si—O—Si bond, with the release of water, is thermodynamically favored. Unfortunately, premature hydrolysis and condensation can destroy a silane and make a siloxane polymer of it before it has a chance to be incorporated into a latex in a uniform and well controlled fashion during polymerization. Hydrolysis and condensation after incorporation of the silane can prematurely cross-link the latex polymers during storage, resulting in solidification and gelation of the latex or latex-containing product in the container. If the cross-linking occurs within the latex microparticles, gelation may not be apparent, but the particles will not flow together and will not coalesce after application. This can result in reduced gloss (for coatings) or brittle films that have no integrity when exposed to solvents, or sealants with poor integrity. On the other hand, if this process can be controlled, a latex can be produced that uses this chemistry to cross-link the polymer system after application, to give superior properties.

In some applications, it is possible to heat the substrate after application of a silane-containing latex coating. The "stoving" or baking of articles coated with paint is well known. This heat can be used to "activate" the silane chemistry described, provided the chemistry can be kept "latent" while the silane-modified polymer system is stored on the shelf awaiting use. However, heating uses energy and some substrates may not be able to withstand heating. Catalysts, such as acids, bases, and metallic compounds (tins, titanium derivatives, etc.) may be used to catalyze the reaction. This is normally accomplished by using a two pack system, which is less desirable than a one pack system. Two pack systems require control of the amount of additive, and may have very limited "open life" or "pot life" after addition of the catalytic agent.

There is a desire to have a one pack system that cures under ambient conditions after application and that, at the same time, does not prematurely react during storage. For practical use, a product, such as a coating, must be stable during storage for many months or years. This is an extremely difficult goal to achieve, owing to the conflicting needs of reactivity and stability. Any approach that relies on the use of an extremely unreactive silane that can survive storage because of its low reactivity faces the problem of to how make the unreactive silane become reactive on command. To achieve this without heat or a catalyst is very difficult.

In some cases, the goal of shelf stability and room temperature cure in a one pack system can be achieved by using extremely low concentrations of silanes. The rate of condensation of two silanols to form a siloxane cross-link is proportional to the square of the concentration of silanol groups. (The rate equation is second order in silanol concentration.) Thus, the condensation reaction can be slowed by reducing the silane concentration, and the effect is very strong because of the dependence on the square of the concentration. However, if one wishes to obtain a higher level of properties and faster cure of the system after application, it is desirable to increase the silane concentration above levels that are typically stable through the use of very low silane concentrations, i.e., above small fractions of one weight percent in the polymer.

As indicated, trying to control the chemistry occurring in a latex polymer system is not simple or straightforward, with various factors that can influence the results including:

1. Temperature. Polymerizations are typically carried out at elevated temperatures, such as 60 to 65° C. Storage may be at room temperature. Application is usually at or near room temperature, but the applied coating may be heated.
2. Water concentration. While water concentration is high in the aqueous phase—nearly 55 moles per liter—it will be much less in the oil phase. Hydrolysis and condensation rates are influenced by water concentration.
3. Solubility. A hydrolyzed silane, carrying silanols, is much more water soluble than the unhydrolyzed silane. A vinyl silane has a different ratio of polar and non-polar groups than a silane with a methacryloxypropyl substituent on silicon.
4. Chemical structure. Monomeric vinyl silanes tend to be more reactive to hydrolysis than silanes with the same alkoxy groups in which the silicon is not directly attached to a vinyl (unsaturated) group. Once polymerized into an organic copolymer, the alkoxy groups on silicon that is derived from a vinyl silane, and that is, in turn, directly on the polymer backbone, will have reduced reactivity due to steric shielding by the bulky polymer chain. The same factor reduces reactivity for condensation as well as for hydrolysis. In comparison, the silicon derived from a methacryloxypropyl silane is several atoms away from the backbone, and its chemistry is less influenced by steric factors.
5. Environmental variables. Factors, such as pH and the concentration of acidic or basic groups or metal ions and nucleophiles in the reactants, will influence the silane chemistry in different ways, depending on the type of silane, whether hydrolysis and/or condensation are being considered, and the like.

The complexity of these interactions makes it extremely difficult to predict the results of a synthesis before actually running the reaction and testing the results.

Commercially available silanes that can copolymerize by free radical induced addition polymerization with acrylic and vinyl organic comonomers, and that are available in sufficiently large production quantities to be practical for large scale industrial use, are either vinyl functional silanes or methacrylate functional silanes. An example of a vinyl functional silane is vinyltrimethoxysilane. An example of a methacrylate functional silane is methacryloxypropyltrimethoxysilane. As a class, vinyl functional silanes are substantially less expensive per pound than methacrylate silanes.

In large scale commercial applications, vinyl functional silanes may be preferred if it is possible to use them, because both the lower cost per pound of vinyl silanes (relative to methacrylate silanes) and their lower equivalent weight per alkoxysilane (or silanol) group give them a cost advantage (over methacrylate silanes) per silyl group incorporated into the polymer. In another embodiment of a commercial application, both the lower cost per pound of vinyl silanes (relative to methacrylate silanes) as well as their lower equivalent weight per alkoxy silane group, may be used for a commercially viable technology. Owing to the selective nature of the reactivity of the double bond during copolymerization with vinyl and methacrylic or acrylic monomers, vinyl silanes can copolymerize readily with vinyl monomers, such as vinyl acetate. Vinyl monomers do not readily copolymerize with (meth)acrylate double bonds and special care may be used to achieve uniform incorporation of any vinyl monomer (whether it is a silane or not) into polymers consisting primarily of methacrylate or styrenic monomers. However, for many end uses, more expensive methacrylate or acrylate organic comonomers may be used, because the resulting polymers have superior durabilty, weatherabilty, higher glass transition temperatures, and other superior properties, even in the absence of silane comonomers.

When considering the rate of reaction to incorporate the silane into the polymer, one must also consider the rate of hydrolysis of the silane before and after incorporation in the latex polymer, as noted above. In general, trialkoxyvinylsilanes hydrolyze more quickly than (meth)acryloxyalkyltrialkoxysilanes as free monomers. Once the silanes have been incorporated into the polymer, the trialkoxy silane residue will tend to be less reactive in hydrolysis and condensation because of the steric shielding arising from the location of the silicon directly on the polymer backbone.

Thus, overall, the problem to be solved is how to achieve a shelf stable, one pack, silane modified aqueous dispersion polymer (latex) system using vinyl silanes with (meth)acrylic organic comonomers, while achieving silane concentrations well above 1% by weight, up to 5% or even more, that will cure at room temperature to a solvent and chemical resistant product, and that can be stored for an extended period of time, for example at least six months and, preferably, over one year, more preferably up to three years, without premature cross-linking to a degree sufficient to render them substantially useless for coatings and sealants applications.

U.K. Patent No. 1,407,827 discloses a process for the manufacture of stable coagulate-free aqueous vinyl dispersions having improved adhesion. In this process, (i) (a) one or more monomers selected from vinyl esters of carboxylic acids, acrylic acid esters, and methacrylic acid esters, and optionally up to 25% by weight (relative to the total weight of component (i)) of one or more other singly-olefinically-unsaturated water-insoluble monomers, or (b) a mixture of styrene and up to 40% by weight (relative to the mixture) of butadiene, is copolymerized with (ii) from 0.3 to 5% by weight (relative to the total weight of component (i)) of a silicon compound of a given general formula. Polymerization is carried out at a temperature within the range of from −15 to +100° C. in an aqueous phase, and in the presence of a water-soluble free-radical initiator and an emulsifier and/or protective colloid.

U.S. Pat. No. 3,575,910 discloses silicone-acrylate copolymers, aqueous emulsions of these copolymers, latex paints containing the copolymers and articles of manufacture having a coating containing the copolymers.

U.S. Pat. No. 3,706,697 discloses that the aqueous emulsion polymerization of acryloxyalkyl alkoxysilane, alkyl acrylic esters, and optionally other vinyl monomers produces copolymers that are curable at low temperatures. The silane may be introduced to the polymerization after a portion of the other monomers are polymerized. It is said that heat curing improves the solvent resistance of cured as-cast films of the latex and that silanol curing catalysts enhance the cure rate.

U.S. Pat. Nos. 3,729,438 and 3,814,716 disclose latex polymers comprising a dispersion of an interpolymer selected from the class consisting of (A) a copolymer of vinyl acetate and vinyl hydrolyzable silane and (B) a terpolymer of vinyl acetate, an ester, e.g., acrylic ester, maleic ester or fumarate ester, and vinyl hydrolyzable silane, as well as the cross-linked polymers derived therefrom. The latex polymers are said to have utility as protective surface coatings and as vehicles for paint formulations.

U.S. Pat. No. 4,716,194 discloses that the removability of acrylate based pressure sensitive adhesives is substantially improved by the addition thereto of a small amount of an organofunctional silane monomer.

U.S. Pat. No. 5,214,095 discloses stable, aqueous emulsion copolymers with controllable siloxane cross-linking functionality. These copolymers are prepared by a concurrent free radical and cationic initiated emulsion polymerization of at least one free radical initiatable monomer, at least one linear siloxane precursor monomer, and at least one bifunctional silane monomer having both free radical polymerizable and silicon functional groups. The copolymers are said to be useful in curable coatings, paints, caulks, adhesives, nonwoven and ceramic compositions and as modifiers, processing aids and additives in thermoplastics, cements and asphalts.

U.S. Pat. No. 5,482,994 discloses polymer latices that are compositions formed by adding an unsaturated alkoxy silane and an initiator to a preformed emulsion polymer. The polymer latices are said to have utility as protective surface coatings, adhesives, sealants and as vehicles for paint formulations.

U.S. Pat. No. 5,599,597 discloses unreinforced or reinforced concrete moldings, for example concrete pipes, with improved corrosion resistance to acids and acidic sewage, improved permeation resistance to inorganic and organic liquids and gases and improved mechanical stability. The reference discloses moldings produced by press molding machines or extrusion machines or concrete pipe pressing machines, in which plastic-viscous concrete mixtures of hydraulic inorganic binders, preferably cement, aggregates and water, are allowed to harden. In the reference, in the preparation of the plastic-viscous concrete mixtures, an effective amount of an aqueous plastics dispersion based on anionic and hydrolysis-resistant copolymers of ethylenically unsaturated monomers is added, with the minimum film forming temperature (MFT) of which is above the setting temperature of the concrete mixture, preferably above 23° C.

U.S. Pat. No. 5,932,651 discloses emulsion copolymerizing a particular cross-linker, i.e., either a siloxane or silazane, with an organic monomer. An emulsion can be formed having particles consisting of polymer chains formed from organic monomer. Depending on the cross-linker and reaction conditions, these emulsion polymer chains can be either crosslinked or uncross-linked. The uncross-linked polymer chains can be cross-linked at a later point by the addition of a suitable catalyst.

U.S. Pat. No. 5,994,428 discloses storage-stable, silane-modified core-shell copolymers comprising a shell-forming copolymer I of a) from 70 to 95% by weight, based on the overall weight of the shell, of acrylic and/or methacrylic $C_1$- to $C_{10}$-alkyl esters of which from 20 to 80% by weight have a water solubility of not more than 2 g/l and from 80 to 20% by weight, based in each case on the comonomers a), have a water solubility of at least 10 g/l, and b) from 5 to 30% by weight, based on the overall weight of the shell, of one or more ethylenically unsaturated, functional and water-soluble monomers including a proportion of from 25 to 100% by weight, based on the comonomers b), of unsaturated carboxylic acids, and a core-forming copolymer II of one or more monomers c) from the group of the vinyl esters, monoolefinically unsaturated mono- or dicarboxylic esters, vinylaromatic compounds, olefins, 1,3-dienes and vinyl halides, wherein the shell contains no silane compounds and the core comprises one or more silane compounds d) from the group of the mercaptosilanes alone or in combination with olefinically unsaturated, hydrolyzable silicon compounds.

U.S. Pat. No. 6,130,287 discloses an emulsion polymer comprising a protective colloid and a functionalized silane component which is of a given structural formula.

WO 98/35994 discloses emulsion polymers that are said to have an excellent combination of blocking resistance, water spotting resistance and ethanol spotting resistance. These polymers are made from a monomer mixture including a monomer with a highly polar group that includes either a carboxylated or sulfonated monomer, or both, a monomer having a hydrolyzable silicone group, and a nonfunctional monomer that can be selected to provide a desired minimum film formation temperature. These polymers are said to be useful in paint and coatings applications.

European Patent Publication No. 0 327 376 discloses copolymers of vinyl esters and silicon monomers, with very low levels of the silicon monomer, that are said to be especially suitable as binders for emulsion paints, giving good scrub resistance. Vinyltrimethoxysilane is copolymerized with organic comonomers comprising at least 40% vinyl acetate. Substantial or full hydrolysis of the silanes to silanols is expected. pH is not mentioned as a critical variable, and no pH ranges are indicated.

Bourne et al., *J. Coatings Technology*, 54:69-82, #684, (January, 1982) describe attempts to obtain stable silane-modified latex copolymers from a variety of acrylate and methacrylate organic monomers by copolymerization with various methacrylate functional alkoxy silanes. These attempts met with failure. A range of pH conditions was attempted with ethyl acrylate as the comonomer. Conditions including starting at pH 9 or pH 7 and allowing the pH to drift, as well as pH 9 or no pH adjustment resulted in gelation (coagulation) during the reaction. Runs made at pH 7 did not coagulate during synthesis. However, even those preparations gave unacceptable levels of coagulum and inadequate shelf stability.

Marcu et al., *Macromolecules*, 36:328-332 (2003) carried out extensive studies using extraordinary techniques in attempts to obtain stable silane modified emulsion polymers. These authors attempted to copolymerize vinyltriethoxysilane with butyl acrylate. In order to obtain stable emulsion polymers, they had to resort to the use of a "mini-emulsion" technique. This technique involved addition of hexadecane to the reaction mixture to form an oil phase that might "protect" the silane from hydrolysis, plus the use of ultrasound to achieve extremely high shear and agitation. pH control is mentioned as being prominent in the literature and is used in their work. The experiments were run using sodium bicarbonate buffer at one mole % on monomers, at pH 6.5 (page 330, experimental section.) Even with these techniques, using the reaction scheme of batch reaction, they were unable to get the silane to copolymerize by free radical addition polymerization with the butyl acrylate. Instead, hydrolysis and condensation reactions of the reactions of vinyltriethoxysilane produced some form of oligomer, which eventually reacted with the organic latex polymer, possibly by transesterification or some other heterolytic mechanism. Control reactions run without the oil phase were also run, and gave poor results.

Cooke et al., *Emulsion Polymerization with Hindered Silane Monomers*, presented at Silicones in Coatings III, Barcelona, Spain, Mar. 28-30, 2000, addresses the use of highly hindered silanes with reduced hydrolytic reactivity, such as vinyl-tri-isopropoxysilane and methacryloxypropyl-tri-isopropoxysilane, with acrylate or methacrylate comonomers. Further studies with this type of silane were reported in Silicones in Coatings IV, at Guildford, UK, May 30-31, 2002. In this work, the use of sodium bicarbonate buffer to control pH is described and it is stated not to be necessary with the vinyl silanes, only with the methacrylate silanes. This work does not involve vinyltriethoxysilane.

Many other publications and patents exist as well, for example, a review in *Silanes in Coatings Technology*, published in *The Journal of the Oil and Colour Chemists' Association*, 79:539-550 (December, 1996). The large number of publications and patents since the 1970's attests to the difficulty of this problem. Many give conflicting advice about conditions, such as pH and reaction conditions, and many involve other reagents, other comonomers, and the like, all of which have the potential to change the complex balance among hydrolysis, condensation, and free radical polymerization in a system with a water phase and an oil phase.

The disclosures of the foregoing are incorporated herein by reference in their entirety.

SUMMARY OF THE INVENTION

There is provided a (meth)acrylic latex modified with a vinyl silane, e.g., vinyltriethoxysilane, under specified conditions by a novel process and synthesized to a specific range of composition that is stable to storage and provides self curing latex systems that can be cured to solvent resistant films with no added catalyst or heat.

In one embodiment, the present invention is directed to a composition that is an aqueous (meth)acrylic latex copolymer, modified by incorporation of a vinyl silane bearing hydrolyzable groups, such as alkoxy groups, that can be cured at room temperature without added catalyst after application to a substrate to provide a cross-linked, solvent resistant film or object, and that is shelf-stable. In one embodiment, the latex comprises at least about 10% and up to about 60% of the alkoxy groups derived from the vinylalkoxysilane hydrolyzed to release alcohol during the polymerization. In another embodiment, the vinyl silane is a vinyltrialkoxysilane, where the alkoxy moiety is ethoxy or n-propoxy.

In another embodiment, the present invention is directed to a process for making this latex that is broadly similar to known latex polymerizations, but is unique in that a specific range of pH is maintained during the polymerization, wherein the vinyl silane is vinyltriethoxysilane at a concentration up to 3 mole %, possibly as much as 5 mole %, and greater than 0.5 mole % relative to other monomers. This process deliberately hydrolyzes some of the alkoxy silane groups to release alcohol and form silanols, but does not produce such a high level of silanols that the system becomes unstable and will not survive shelf aging.

In contrast to known art, which describes pH control during synthesis of silane-containing latexes in many conflicting references with many different polymer systems and silanes, and discusses avoiding silane hydrolysis and/or condensation, in this invention silane reactions of hydrolysis and further silane reactions are controlled to specific, desirable levels.

More particularly, the present invention is directed to a process for preparing a shelf-stable, one pack, silane modified (meth)acrylic latex interpolymer composition comprising continuously adding at least a portion of a mixture comprising at least 0.5 mole percent of a vinyl silane comprising hydrolyzable groups and up to 99.5 mole percent of a (meth) acrylic monomer to water and a surfactant in a reaction vessel, wherein said addition is carried out in the presence of a polymerization initiator and buffer sufficient to maintain the pH of the reaction at a level of at least 6 throughout the reaction, while simultaneously hydrolyzing from about 10 to about 60% of the hydrolyzable groups of the vinyl silane.

In another embodiment, the present invention is directed to a shelf-stable, one pack, silane modified (meth)acrylic latex interpolymer composition prepared by a process comprising continuously adding at least a portion of a mixture comprising at least 0.5 mole percent of a vinyl silane comprising hydrolyzable groups and up to 99.5 mole percent of a (meth) acrylic monomer to water and a surfactant in a reaction vessel, wherein said addition is carried out in the presence of a polymerization initiator and buffer sufficient to maintain the pH of the reaction at a level of at least 6 throughout the reaction, while simultaneously hydrolyzing from about 10 to about 60% of the hydrolyzable groups of the vinyl silane.

DESCRIPTION OF THE PREFERRED EMBODIMENTS

The invention in one aspect relates to an aqueous (meth) acrylic latex copolymer, modified by incorporation of a vinyl silane bearing hydrolyzable groups, such as alkoxy groups, that can be cured at room temperature or above without added catalyst after application to a substrate to provide a cross-linked, solvent resistant film or object that is still shelf-stable over an extended period of time.

As used herein, being shelf-stable means being stable over an extended period of time at room temperature. Shelf-stable compositions of silane modified latex interpolymers maintain a significant fraction of their performance characteristics after storage at ambient temperatures. Performance characteristics include room temperature cross-linking upon application, solvent resistance after curing, and gloss retention after natural or accelerated weathering.

In one embodiment of the invention, the composition is shelf-stable for at least one year at room temperature after natural aging (or in an equivalent accelerated aging test accepted by those of ordinary skill in the latex polymerization and formulation art). In a second embodiment, it is stable for over six months at room temperature in natural aging (or in an equivalent accelerated aging test). In a third embodiment, it is stable up to three years at room temperature.

The process of the present invention comprises the aqueous copolymerization of acrylate monomers and a vinyl alkoxy silane under conditions that are similar to, but distinct from, the conventional. Continuous addition of silane along with the other comonomers, preferably from the very beginning of the reaction, is necessary to incorporate some of the vinyl silane in the polymer by free radical addition polymerization. If the vinyl silane is not added continuously, it will not copolymerize, and may form a separate siloxane copolymer, which may or may not be grafted or otherwise reacted with the organic polymer during the course of the reaction. As another possibility, the vinyl double bonds may not react until all of the acrylate monomers have hydrolyzed. Meanwhile, the vinyl silanes may be hydrolyzing, to form condensable silanols with unreacted vinyl groups, and, in turn, a siloxane condensate polymer or oligomer. This causes an undesirable and non-uniform incorporation of silane, or, in some cases, may result in a physical mixture of two materials—an organic polymer and a siloxane polymer, which is undesirable.

Vinyl silanes that can be employed in the practice of the present invention include, but are not limited to, vinylalkoxysilanes, especially vinylalkoxysilanes where the alkyl moiety of the alkoxy group is primary, e.g., vinyltriethoxysilane, vinylmethyldiethoxysilane, vinyl-tri-n-propoxysilane, vinyl-tri-(methoxyethoxy)silane, and the like. Other vinyltri- and dialkoxy silanes may be used under some circumstances, but control of the reaction to obtain the desired degree of partial hydrolysis becomes more difficult. Silanes solely substituted with methoxy groups hydrolyze too readily and release toxic methanol. Most higher alkoxy silanes, i.e., above propoxy, hydrolyze too slowly for convenient use. Secondary alkoxysilanes, such as vinyl-tri-isopropoxysilane, are definitely too unreactive, as are tertiary alkoxysilanes. Butoxy silanes generally hydrolyze too slowly and cause undesirable odors from the butanols released. In one embodiment, the silane is either vinyltriethoxysilane or vinylmethyldiethoxysilane. In a second embodiment, the silane is vinyltriethoxysilane.

A wide range of acrylic and methacrylic comonomers common in the art can be employed in the practice of the present invention. For reference, see *Waterborne and Solvent Based Acrylics and their End user Applications and Resins for Surface Coatings, Volume I, Acrylics and Epoxies*, supra, which also describes process details, optional comonomers, test methods, and conventional process methods that can be employed. Styrenic monomers may be included readily, as they copolymerize easily with acrylic monomers, but not at levels sufficient to cause property deterioration. Styrenic materials, however, are strong absorbers of UV light and may reduce durability to exterior exposure. Optionally, up to 20 weight percent of one or more vinyl organic comonomers, such as vinyl acetate, vinyl propionate, or vinyl neodecanoate (VEOVA™), may be added, but preferably at a level low enough to produce no significant deterioration of the durability properties of the final product. Still other comonomers can be included to a small degree, if desired, as long as the system retains its substantially (meth)acrylic characteristics.

In the process of the present invention, a buffer, such as sodium bicarbonate at a level of from about 0.4% up to about 0.7% of the aqueous phase, is used to keep the pH in the range above 6. Higher and lower levels of buffer may be used if higher or lower amounts of acidic or basic materials are present in the reaction. The reaction typically starts at a pH above 8, and after 15-20 minutes lowers to a range of 6 to 7, where it is maintained as monomer is fed. Additional buffer may be added during the reaction. If shelf stability is not necessary for a given application, acceptable latexes can be produced in preparations that have a pH lower than these preferred levels.

During the reaction process, some of the vinyltrialkoxysilane, e.g., vinyltriethoxysilane, hydrolyzes, and the amount of alcohol released can be determined. In one embodiment, the alcohol release is above 10% and less than 60%. In a second embodiment, in a level of about 19% to about 48%, and may vary somewhat with the silane concentration and structure chosen.

The composition produced is an aqueous (meth)acrylic copolymer, in which at least 1 mole %, preferably 1 to 5 mole %, more preferably 3 to 5 mole % (approx. 7 to 9 wt %, depending on the other comonomers) of vinyltrialkoxysilane has been incorporated primarily by copolymerization. In the examples described herein, with the particular comonomers used, 3 mole % of vinyltriethoxysilane corresponds to 5.2 weight %.

The composition may be further characterized by its ability to form a cross-linked solvent resistant film when applied to a metal panel and allowed to stand at room temperature for 7 days. The ability to withstand at least 75 MEK (methyl ethyl ketone) double rubs is one measure of satisfactory cross-linking. This technique is described in ASTM D 4752-87 and is well known to those of ordinary skill in the coatings art.

Initiation of polymerization may be carried out by standards methods known in the art, including but not limited to redox initiation, thermal initiation, and combinations thereof.

Examples of polymerization initiators, specifically thermal initiators, include but are not limited to the followings: peroxides such as hydroperoxides, t-butyl hydroperoxide, di-t-butyl peroxide, benzoyl peroxide, benzoyl hydroperoxide, 2,4-dichlorobenzoyl peroxide, and the like; azo compounds such as azoisobutyronitrile (AIBN); inorganic persulfates such as potassium persulfate, ammonium persulfate, sodium persulfate, etc.; t-butyl peracetate; isopropyl peroxycarbonate, and combinations thereof.

Redox initiators are combinations of two or more components that react chemically to form free radicals. Examples of the redox initiatior combinations include but are not limited to the followings, and their combinations thereof:

Persulfate-bisulfite: persulfates such as sodium, potassium, and ammonium persulfate, with reducing agents such as sodium thiosulfate, sodium metabisulfite, sodium hydrosulfite, sodium bisulfite, sodium formaldehyde sulfoxylate) and optionally a ferrous salt, e.g. ferrous sulfate or ferrous ammonium sulfate;

Chlorate-bisulfite: sodium bisulfite and potassium chlorate;

Peroxide-iron: hydrogen peroxide, e.g. t-butyl hydroperoxide, and a ferrous salt, optionally including a reducing agent such as a sugar, e.g. dextrose or fructose, to regenerate ferrous ions;

Persulfate-mercaptan: a persulfate such as potassium persulfate and a mercaptan such as lauryl mercaptan.

EXAMPLES

Examples 1-13 are carried out using the redox initiation method. Examples 14-16 are carried out via the thermal initiation method.

The examples employ accelerated aging tests as used by those of ordinary skill in the latex polymerization and formulation art, i.e., the storage of samples at elevated temperatures to simulate longer storage at lower temperatures, such as room temperature. Perfectly exact correlation of accelerated results with room temperature results or with "real world" end use conditions is not possible for all possible specific cases; however, it is commonly accepted that one month of storage at 50° C. generally approximates one year of storage at room temperature, nominally 23° C. In the examples, the data were obtained primarily on samples aged at 50° C.

The following is a listing of apparatuses that can be used for the examples of the invention.

Apparatus 800 mL jacketed reaction flask (for 300 gram preparations.)

Heating fluid circulator

Thermometer

Overhead Stirrer

Metering pump for monomer solution (FMI piston pump RP-G400)

Syringe pump for initiator solutions (Syringe infusion pump 22, from Harvard Apparatus)

Examples 1-13

In these examples, redox initiation method was used wherein the reactions were carried out at a temperature between 60 and 65° C., which in one embodiment, is the range for the redox initiator system used. However, any temperature can be used at which initiation methods can be used effectively.

I. Reagents and Materials

Methyl methacrylate (MMA)

Butyl acrylate (BA)

Methacrylic acid (MAA)

Vinyltriethoxysilane—Silquest® A-151 silane (available from General Electric Company.)

Sodium bicarbonate ($NaHCO_3$)

Ferrous sulfate ($FeSO_4$)

Sodium formaldehyde sulfoxylate (SFS)

Potassium persulfate ($K_2S_2O_8$)
Ammonium persulfate [$(NH_4)_2S_2O_8$]
t-Butyl hydroperoxide, 70 wt. % in water (t-BHPO-70)
IGEPAL® CA-897 (Rhodia)
ABEX® 2020 (Rhodia)
Deionized water
Ammonium hydroxide II. Formulation Employed in Examples 1-13 (Based on 300 Gram Total)

A. Water, Optional Buffer (Sodium Bicarbonate), Surfactant(s):

| Deionized Water: | 150 g |
|---|---|
| Sodium Bicarbonate buffer | varied amounts |
| IGEPAL CA-987 | 13.5 g |

B. Monomers

Monomers were chosen in these particular examples to keep a constant percentage of MAA, and a constant ratio of MMA to BA, as silane content was varied. There is no limitation implied on the process. For each 100 grams of monomers, the following ratios were used, presented to allow percent amounts to be seen easily. As the syntheses all used 125 grams of monomer, the weight amounts are to be multiplied by 1.25 to calculate the amount of monomer charged in the working examples. For example, for a 3 mole % silane incorporation, the amounts of monomers used would be 6.50 grams of vinyltriethoxysilane, 38.50 grams of BA, 78.125 grams of MMA, and 1.875 grams of MAA.

| | Mole (Weight) Percent Silane Desired in Copolymer | | | |
|---|---|---|---|---|
| | 0% (0.0%) | 1% (1.73%) | 2% (3.5%) | 3% (5.2%) |
| Vinyltriethoxysilane | 0 g | 1.75 g | 3.5 g | 5.2 g |
| BA | 32.5 g | 31.9 g | 31.5 g | 30.8 g |
| MMA | 66.0 g | 64.8 g | 63.6 g | 62.5 g |
| MAA | 1.5 g | 1.5 g | 1.5 g | 1.5 g |
| Total | 100 g | 100 g | 100 g | 100 g |

C. Initiators:

| $FeSO_4$ (0.15%, in water) | 1.20 g |
|---|---|
| $K_2S_2O_8$ (solid) | 0.9 g |
| SFS (2%, in water) | 9.0 g |
| t-BHPO-70 | 0.1 g |

Note: All initiator solutions should be freshly prepared prior to use.

III. Synthesis

Examples 1-13

1. 150 mL of deionized water was added to an 800 mL jacketed reaction flask, and 13.5 grams of surfactant and the indicated amount of sodium bicarbonate were added with gentle stirring. The contents were heated to 63° C. with constant temperature fluid in the jacket while purging the flask with $N_2$. The $N_2$ blanket was maintained throughout the run.

2. The silane and acrylic monomers (125.2 grams total) were mixed and transferred to a separate addition funnel.

3. Initiator was added, $FeSO_4$ (1.2 grams, 0.15% aq) followed by $K_2S_2O_8$ (0.9 g), with agitation to the surfactant solution prepared in Step 1. Stirring was continued for 5 minutes.

4. The first portion of monomer was added to the flask. Ten percent of the monomer mixture prepared in Step 2 (12.5 grams) and 10% of the SFS solution (0.9 gram) were added to the reaction flask via two separate pumps over a period of about one minute. An exotherm was usually noted. The reaction was allowed to run at a temperature of 65° C. for 15 minutes maintaining good agitation. The reaction temperature was maintained within 2-3 degrees of 65° C. for steps 5-7.

5. The remainder of monomer mixture (112.7 grams) and an additional 70% of the SFS solution (10.5 grams) were fed continuously through separate pumps over a period of three hours. Sometimes a slight viscosity increase was noted.

6. The reaction mixture was stirred for another 30 minutes after the monomers and this portion of initiator were completely added.

7. At that point, the t-BHPO-70 (0.01 gram), followed by the remaining SFS solution (1.8 grams) were added over a period of 30 minutes.

8. The latex was allowed to cool to room temperature. The pH was adjusted to 7.5 using ammonium hydroxide solution (<10% aq). The latex was filtered using a 200 mesh nylon screen.

IV. Results

Examples 1-13

Examples 1, 2, 3, and 4

Latexes were prepared according to the general procedure, using 2 mole % vinyltriethoxysilane, and the indicated amount of buffer.

Example 1a and 1b

This preparation was carried out in duplicate. It involved no buffer, and the pH during the reaction was allowed to drift downward from an initial pH of 4-5, rapidly decreasing within 15 minutes to less than pH 3 for the 3.5 additional hours of reaction time.

Example 2

This preparation used 0.2 gram of sodium bicarbonate buffer (0.13% in the water phase.) The pH during reaction was allowed to drift downward from an initial pH of 8.5, rapidly decreasing within 15 minutes to pH 6.5 to 7, and further decreasing steadily to pH 2-3 at the end of the reaction.

Examples 3a and 3b

These duplicate preparations used 0.25 gram of sodium bicarbonate buffer (0.17% in the water phase.) The pH during the reaction was allowed to drift downward from an initial pH of 8.5, rapidly decreasing within 15 minutes to pH 6.5 to 7, and further decreasing steadily to pH 3.5 (3a) and 4 to 5 (3b) at the end of the reaction.

Example 4

This preparation used 1.0 gram of sodium bicarbonate buffer (0.67% in the water phase.) The pH during reaction was allowed to drift downward from an initial pH of 8.5, slightly decreasing within 15 minutes to pH 8 to 8.5, and further decreasing steadily to pH 6.5 at the end of the reaction.

Examples 1a and 1b showed acceptable performance in the initial tests within a week of preparation. However, after one year of shelf storage, performance deteriorated substantially.

Example 2 gave acceptable performance in the as-made tests, but showed notable deterioration after one year.

Examples 3 (a and b) and 4 gave excellent performance as made and after one year. After one year, the slightly better initial performance of Example 3 had decreased and the performance of Example 4 was equal or higher. At 2 mole % (3.5 wt. %) vinyltriethoxysilane, avoidance of the extreme lows of pH during reaction is sufficient to obtain acceptable storage for one year at room temperature.

Examples 5, 6, 7, and 8

Latexes were prepared according to the general procedure, using 3 mole % vinyltriethoxysilane, and the indicated amount of buffer.

Example 5

This preparation was carried out with no buffer, and the pH during reaction was allowed to drift downward from an initial pH of 4, rapidly decreasing within 15 minutes to less than pH 3 for the 3.5 additional hours of reaction time.

Example 6

This preparation used 0.15 gram of sodium bicarbonate buffer (0.10% in the water phase.) The pH during the reaction was allowed to drift downward from an initial pH of 8.5, rapidly decreasing within 15 minutes to pH 6.5, and further decreasing steadily to pH 2-3 at the end of the reaction.

Example 7

This preparation used 0.2 gram of sodium bicarbonate buffer (0.13% in the water phase.) The pH during the reaction was allowed to drift downward from an initial pH of 8.5, rapidly decreasing within 15 minutes to pH 5.5 to 6, and further decreasing steadily to pH 2-3 at the end of the reaction.

Example 8

This preparation used 0.5 gram of sodium bicarbonate buffer (0.33% in the water phase.) at the beginning. The pH during the reaction was allowed to drift downward from an initial pH of 9, decreasing within 15 minutes to pH 8, and further decreasing steadily to pH 5.5-5 at the end of three hours of monomer addition. An additional 0.3 gram of buffer was added at that point and the pH was 7-7.5 until the end of the reaction. Total buffer was 0.8 gram, 0.53% in the aqueous phase.

Under the more stringent conditions of higher silane concentration (3 mole % vs. 2 mole %), the ability of systems that finished their reaction at substantially acidic pH's to provide good shelf life and good performance in room temperature cure testing was diminished when compared to the samples made with 2 mole % silane. Since the rate of silanol condensation is proportional to the square of the concentration of silanol groups, the rate of premature cross-linking under storage (all other things being equal) would increase by the ratio of 9 (i.e., 3 squared) to 4 (i.e., 2 squared), i.e., 225%. While Example 5 was clearly inferior at both as-made and one year tests, examples 6, 7, and 8 were all acceptable in "as made" testing. It is interesting to note that allowing panels to cure for 30, 40, or 50 days at ambient conditions gave much better solvent resistance for Example 8 than for Examples 6 and 7. After one year, Example 8 was clearly superior to examples 5, 6, and 7.

Examples 9 and 10

Latexes were prepared according to the general procedure, using 3 mole % vinyltriethoxysilane, and the indicated amount of buffer. Example 10 was prepared in duplicate, as 10a and 10b.

Example 9

This preparation was carried out with no buffer, and the pH during the reaction was allowed to drift downward from an initial pH of 1.64. After 15 minutes the pH was 1.54 to 1.69. After one hour of monomer addition, the pH was 1.26, and it remained strongly acidic over the remainder of the reaction.

Examples 10a and 10b

These duplicate preparations used 0.65 gram of sodium bicarbonate buffer (0.43% in the water phase.) The pH during reaction was allowed to drift downward from an initial pH of 9, rapidly decreasing within 15 minutes to pH 6.5, and holding at 6 to 6.5 for the remainder of the reaction.

Room temperature tests were not carried out on these samples as made or at one year of storage. After 21 months of storage, 10 and 10b showed substantial superiority on MEK rub tests. At 33 months of storage, the superiority was still clear, even though the films of Examples 10a and 10b were brittle and fragmented in the gel test. At least 21 months shelf life was obtained.

Example 11

A latex was prepared according to the general procedure, using only 0.5% vinyltriethoxysilane, and no buffer. The pH profile was not measured, but was similar to that of Examples 1, 4, and 9, since the same procedure was followed. The reaction mixture was substantially acidic.

Data were taken on Example 11 as made and after 30 months. The latex was not overly cross-linked at 30 months, as evidenced by a coherent sample after extraction, but showed only 49% gel and only 50 MEK rubs after 7 days at ambient.

The as-made sample also showed poor solvent resistance at 7 days: only 15 MEK rubs and 2 to 3 on the MEK spot test. These results show that stable systems can be produced, albeit with lower properties, by reducing the amount of silane. This property set may be sufficient for some applications, but the cured film is not substantially resistant to solvents. Not enough silane was incorporated.

Comparative Example 1

A latex was prepared with no buffer and no silane. "As made" testing showed only 10 MEK rubs after 7 days at ambient, and spot test results were only 1 for acetone and MEK tests at 7 days. Aged samples were not tested, but no change in values is expected, because no "self-cross-linking" chemistry mechanism is built into the latex.

TABLE 1

Data on Preparation and Testing of Examples 1 Through 11 and Comparative Example 1 - Table 1A-A

| Working Example | Composition mole % of silane | Buffer NaHC03 wt. % in water phase | Buffer NaHC03 grams in water phase | pH profile - pH measured at time t in minutes | | | | | | % ROH released | Coagulum wt % |
|---|---|---|---|---|---|---|---|---|---|---|---|
| | | | | t = 5 | t = 20 | t = 80 | t = 140 | t = 200 | t = 200 to 260+ | | |
| Comp 1 | No Silane | 0 | 0 | — | — | — | — | — | — | — | — |
| 1a | 2% A-151 | 0 | 0 | 4-5 | 3-2 | 2-3 | — | — | — | | 2% |
| 1b | 2% A-151 | 0 | 0 | | 3.0 | 2-3 | — | — | — | 41% | 2% |
| 2 | 2% A-151 | 0.13 | 0.2 | 8.5 | 6.5-7 | 5-4.5 | 4.0 | 2-3 | 2-3 | | 3% |
| 3a | 2% A-151 | 0.17 | 0.25 | 8.5 | 6.5-7 | 5.0 | 5.0 | 5-4 | 4-3.5 | — | 3% |
| 3b | 2% A-151 | 0.17 | 0.25 | 8.5 | 7.0 | 5.5 | 5.5-5.0 | 5.0 | 5-4 | — | 1% |
| 4 | 2% A-151 | 0.67 | 1.0 | 8.5 | 8-8.5 | 7-7.5 | 6.5-7 | 6.5 | 6.5 | 29% | 3% |
| 5 | 3% A-151 | 0 | 0 | 4 | 3 | <3 | — | — | — | 62% | 4% |
| 7 | 3% A-151 | 0.13 | 0.2 | 8.5 | 5.5-6 | 5 | 4 | 3 | 2-3 | — | 2% |
| 6 | 3% A-151 | 0.10 | 0.15 | 8-8.5 | 6.5 | 5 | 4.0 | 2-3 | 2-3 | 48% | 1% |
| 8 | 3% A-151 | 0.53 | 0.5 then +0.3 | 9 | 8 | 6.5-6 | 6 | 5.5-5 | 7-7.5 | 29% | 2% |
| 9 | 3% A-151 | 0 | 0 | 1.64 | 1.54-1.69 | 1.26 | — | — | — | | 3% |
| 10a | 3% A-151 | 0.43 | 0.65 | 9 | 6.5 | 6-6.5 | 6 | 6 | 6-6.5 | — | 2% |
| 10b | 3% A-151 | 0.43 | 0.65 | 8.6-9.0 | 7.0-8.2 | 8.1-5.4 | 5.4 | 5.6 | 6.3 | — | 1% |
| 11 | 0.5% A-151 | 0 | 0 | — | — | — | — | — | — | | 1% |

TABLE 1A-B

Room Temperature Cure Data on Fresh Latex Preparations

| Working Example | age of SAL months | baking | MEK Rubs 7 day | MEK Rubs 30 day | MEK Rubs 40 day | spot test acetone, 7 day | spot test MEK, 7 day | gel content % |
|---|---|---|---|---|---|---|---|---|
| Comp 1 | 0 | none | 10 | — | — | 1 | 1 | |
| 1a | 0 | none | 80 | — | 500 | 4 | 4 | 80.4 |
| 1b | 0 | none | 80 | — | 200* | 4 | 4 | 83 |
| 2 | 0 | none | 70 | — | — | 4-5 | 4-5 | 79.8 |
| 3a | 0 | none | 50 | — | — | 4-5 | 4 | 71.2 |
| 3b | 0 | none | 40 | — | — | 5 | 5 | 69.2 |
| 4 | 0 | none | 90 | — | — | 4 | 4 | 71.9 |
| 5 | 0 | none | 60 | 60 | 60 | 4 | 1, 3-4 | 83.9 |
| 7 | 0 | none | 70 | 140 | 200 | 4-5 | 4 | 82 |
| 6 | 0 | none | 85 | 220 | 230 | 4-5 | 4-5 | 81.9 |
| 8 | 0 | none | 100 | 400 | 650 | 4-5 | 4-5 | 76 |
| 9 | 0 | none | — | — | No Data | — | — | — |
| 10a | 0 | none | — | — | — | — | — | — |
| 10b | 0 | none | — | — | — | — | — | — |
| 11 | 0 | none | 15 | — | — | — | 2-3 | 56.6 |

*Fifty days, not forty days.

TABLE 1A-C

Room Temperature Cure Data on 12 Months Old Latex Preparations

| Working Example Number | age of SAL months | baking | MEK rubs 7 day | spot test acetone, 7 day | spot test MEK, 7 day | gel content % |
|---|---|---|---|---|---|---|
| Comp 1 | 10 | none | 11 | 1 | 1 | |
| 1a | 12 | none | 10 | 3-4 | 3 | (brittle) |
| 1b | 12 | none | 18 | 4 | 3-4 | 92.4 (brittle) |
| 2 | 12 | none | 40 | 4 | 4 | 94.6 |
| 3a | 12 | none | 90 | 4 | 4-5 | 94.7 |
| 3b | 12 | none | 130 | 4 | 4-5 | 97.5 |
| 4 | 12 | none | 110 | 4 | 4-5 | 94.5 |
| 5 | 11 | none | 16 | 3 | 1 | (brittle) |
| 7 | 11 | none | 40 | 4 | 4 | (brittle) |
| 6 | 11 | none | 40 | 4 | 4-5 | (brittle) |
| 8 | 11 | none | 130 | 4 | 4-5 | 95 |
| 9 | — | — | — | — | — | — |
| 10a | — | — | — | — | — | — |
| 10b | — | — | — | — | — | — |
| 11 | — | — | — | — | — | — |

TABLE 1A-D

Room Temperature Cure Data on 21 Months Old Latex Preparations

| Working Example | age of SAL months | baking | MEK rubs 2 day | 7 day | 30 day | 40 day |
|---|---|---|---|---|---|---|
| Comp 1 | — | — | — | — | — | — |
| 1a | — | — | — | — | — | — |
| 1b | — | — | — | — | — | — |
| 2 | — | — | — | — | — | — |
| 3a | — | — | — | — | — | — |
| 3b | — | — | — | — | — | — |
| 4 | — | — | — | — | — | — |
| 5 | — | — | — | — | — | — |
| 7 | — | — | — | — | — | — |
| 6 | — | — | — | — | — | — |
| 8 | — | — | — | — | — | — |
| 9 | 21 | none | — | 10 | — | 150 |
| 10a | 21 | none | — | 210 | — | 350 |
| 10b | 21 | none | — | 120 | — | 350 |
| 11 | — | — | — | — | — | — |

TABLE 1A-E

Room Temperature Cure Data on 33 Months Old Latex Preparations

| Working Example | age of SAL months | baking | MEK rubs 2 day | 7 day | spot test acetone, 1 day | acetone, 7 day | MEK, 7 day | gel content % | Note |
|---|---|---|---|---|---|---|---|---|---|
| Comp 1 | — | — | — | — | — | — | — | — | — |
| 1a | — | — | — | — | — | — | — | — | — |
| 1b | — | — | — | — | — | — | — | — | — |
| 2 | — | — | — | — | — | — | — | — | — |
| 3a | — | — | — | — | — | — | — | — | — |
| 3b | — | — | — | — | — | — | — | — | — |
| 4 | — | — | — | — | — | — | — | — | — |
| 5 | — | — | — | — | — | — | — | — | — |
| 7 | — | — | — | — | — | — | — | — | — |
| 6 | — | — | — | — | — | — | — | — | — |
| 8 | — | — | — | — | — | — | — | — | — |
| 9 | 33 | none | 7 | 11 | 1 | 3 | 1 | (brittle) | viscous |
| 10a | 33 | none | 30 | 130 | 4 | 4-5 | 4 | (brittle) | viscous |
| 10b | 33 | — | — | — | — | — | — | — | very viscous |
| 11 | 30 | none | — | 50 | — | 4-5 | 5 | 49 | — |

TABLE 1B

ID and Performances of Latex as Control Sample for SAL - Table 1B-A

| Composition | buffer | age of latex months | gel content of coating, % baked at 120° C., 20 min. | MEK rub 120° C. baked | RT | spot test MEK, Baked | acetone, baked | MEK, RT | acetone, RT |
|---|---|---|---|---|---|---|---|---|---|
| Acrylic latex (no silane) | 0 | 0 | — | 10 | 6 | 1 | 1 | 1 | 1 |
| Acrylic latex (no silane) | 0 | 0 | — | 20 | — | — | — | — | — |

TABLE 1B-B

| Composition | Buffer | age of latex Months | gel content of coating, % baked at 120° C., 20 min. | MEK rub 120° C. baked |
|---|---|---|---|---|
| Acrylic latex (no silane) | 0 | — | — | — |
| Acrylic latex (no silane) | 0 | 2 | 0 | 7 |

TABLE 1B-C

| Composition | buffer | age of latex months | gel content of coating, % | MEK rub 120° C. baked | RT | MEK, baked | spot test acetone, baked | MEK, RT | acetone, RT |
|---|---|---|---|---|---|---|---|---|---|
| Acrylic latex (no silane) | 0 | 10 | — | 12 | 11 | 1 | 1 | 1 | 1 |
| Acrylic latex (no silane) | 0 | 13 | — | 7 | — | 1 | 1 | — | — |

Examples 12 and 13

In Examples 1 through 10, excessive hydrolysis of the alkoxy silane to release alcohol during the latex preparation produces a latex that may be acceptable as made, but that deteriorates in storage, probably by premature cross-linking. However, if the silane does not hydrolyze at all during the latex preparation, properties will develop much too slowly, if at all, upon application. These examples were synthesized using a different vinyl silane, vinyl tri-isopropoxysilane, which allows much less hydrolysis because of its structure. While not perfectly comparable in all ways to Examples 1 through 10, the data do provide a strong indication that there is a lower limit to the amount of hydrolysis that must occur during synthesis. In particular, a film cast at room temperature that has cured to only 4% gel gives poor properties, and corresponds to hydrolysis of only 19% of the available alcohol. Even after baking to force the cure, the 65% gel was soft, indicating poor cross-linking.

Example 12

A latex was prepared according to the general procedure, using 3 mole % vinyl tri-iso-propoxysilane, instead of vinyl-triethoxysilane, and no buffer. The pH profile was not measured, but was deemed to be similar to that of examples 1, 5, and 9, since the same procedure was followed. The reaction mixture was substantially acidic (pH≦5).

Example 13

This preparation also employed vinyl tri-iso-propoxysilane and used 0.22 gram of sodium bicarbonate buffer (0.15%) in the water phase. The pH during the reaction was allowed to drift downward from an initial pH of 8.5, rapidly decreasing within 15 minutes to pH 6.5, and further decreasing steadily to pH 2-3 at the end of the reaction. Poor performance at room temperature was improved by baking, but MEK rub tests were only acceptable after baking. Example 12, more fully hydrolyzed, cures at room temperature and gives good properties when baked.

TABLE 2

Correlation of Degree of Hydrolysis with Properties of Cured Acrylic Latex Modified with Vinyl Silanes

| Example Number | Buffer Grams and % in water phase | Hydrolyzed silane in latex, % | Gel content of coating film, % Baked at 120° C., 20 min. | R.T cure | MEK rubs 120° C., baked |
|---|---|---|---|---|---|
| 5 | none | 62 | (too brittle to have film) | 84 | 900 |
| 6 | 0.15 g, 0.1% | 48 | 88 | 82 | 1000 |
| 8 | 0.8 g; 0.53% | 29 | 87 | 80 | 600 |
| 12 | none | 63 | 88 | 84 | 350 |
| 13 | 0.22 g, 0.15% | 19 | 65* | 4* | 60 |

*Gel in Example 13 after 120° bake was a soft gel, indicating an incompletely formed network.

In one embodiment of the invention as illustrated in the tables, an acceptable range of hydrolysis for latexes of this general composition and with a vinyl silane as the silane component is more than 19% hydrolysis to provide acceptable properties in room temperature cure. In another embodiment of the invention and for vinyltriethoxysilane-containing materials, the upper limit is less than approximately 62% (Example 5).

Examples 14-16

Thermal Initiation Approach

The above examples were all carried out by the use of "redox initiation" to form the dispersion polymers (latexes).

Redox initiation is a common technique, but "thermal initiation" is another approach for one embodiment of the invention. In examples 14-16, thermal initiation was demonstrated and the results are given in Tables T-1 and T-2.

I. Formulation Employed in Examples 14-16 (Based on 300 Gram Total)

A. Water, Optional Buffer (Sodium Bicarbonate), Surfactant(s):

| Deionized Water: | 136.6 grams |
|---|---|
| Sodium Bicarbonate buffer: | varied amounts |
| Abex 2020 | 14.4 grams |

B. Monomers. Monomers were chosen in these particular examples to keep a constant percentage of MAA, and a constant ratio of MMA to BA, as silane content was varied. Three and five mole percent of silane monomer were used as examples. There is no limitation implied on the process. For each 100 grams of monomers, the following ratios were used, presented to allow the percent amount to be seen easily.

| | Mole (Weight) Percent Silane Desired in Copolymer | | |
|---|---|---|---|
| | 0% (0.0%) | 3% (5.2%) | 5% (8.5%) |
| Silane A-151 | 0 grams | 5.2 grams | 8.5 grams |
| BA | 32.5 grams | 30.8 grams | 29.7 grams |
| MMA | 66.0 grams | 62.5 grams | 60.3 grams |
| MAA | 1.5 grams | 1.5 grams | 1.5 grams |
| Total | 100 grams | 100 grams | 100 grams |

C. Initiator $(NH_4)_2S_2O_8$ 0.38 gram (in 25 grams of aqueous solution)

D. Buffer $NaHCO_3$—used as a 6.25% aqueous solution (for controlling pH at approximately 7 only)

In comparison to the experiments describe in Examples 1-13, higher concentrations of silanes were used. Higher concentrations are harder to keep stable on the shelf, but the results in Examples 1-13 were good enough to encourage these experiments at higher levels—3 and 5 mole %—versus the 1, 2, or 3 mole % used in those examples. Higher silane levels have the potential to offer higher performance levels in the final coating or sealant prepared from the latex. An increase from 3% to 5% in silane concentration has the potential to increase gelation reactions leading to poor shelf storage conditions by the ratio of the square of the concentrations—that is 25 to 9—almost a three-fold increase. Thus, the ability to include 5% silane is a major step and a major change in the formulation. Other minor changes in formulation details will be apparent from considering the synthesis procedure shown below. A higher temperature was used, consistent with thermal initiation.

II. Synthesis

Examples 14-16

1. Deionized water (136.6 mL) was added to an 800 mL jacketed reaction flask, and 14.4 grams of surfactant and 4 mL of sodium bicarbonate solution (in the case of controlling pH to ~7) were added with gentle stirring. The contents were heated to 75° C. with constant temperature heat transfer fluid in the jacket while purging the flask with $N_2$. The $N_2$ blanket was maintained throughout the run.

2. The silane and acrylic monomers (125.2 grams total) were mixed and transferred to a separate addition funnel.

3. The first portions of monomer and initiator were added to the reaction flask. Ten percent of the monomer mixture prepared in Step B (12.5 grams) and 20% of the initiator solution (5 mL) were added to the reaction flask via two separate pumps over a period of about one minute. A slight exotherm was usually noted. The reaction was allowed to run at a temperature of 75° C. for 15 minutes while maintaining good agitation. The reaction temperature was maintained within 2-3 degrees of 75° for following steps.

4. The remainder of monomer mixture (112.7 grams) and initiator solution (20 mL) were fed continuously through separate pumps over a period of three hours.

5. The reaction mixture was allowed to stir for another 30 minutes after the monomers and initiator were completely added.

6. The latex was allowed to cool to room temperature. The pH was adjusted to 7.5 using ammonium hydroxide solution (<10% aq). The latex was filtered using a 200-mesh nylon screen.

III. Results

For Examples 14-16

The results are presented in two tables, Table T1 and Table T2.

Table T1 is for latexes prepared with 5 mole % vinyltriethoxysilane. This table is broken into sections, T1-A, T1-B, etc. These present the synthesis information, the initial test information on the as-prepared latexes, and the test information after accelerated aging at 50° C. for one-half month and one month.

Table T2 presents data obtained with latexes prepared with 3 mole % vinyltriethoxy silane. Synthesis data and test results for freshly prepared latexes are presented; no accelerated aging data are available for this example.

Table T-1: At 5 mole % silane, the samples controlled to pH 7 during polymerization (working examples 14 and 15, according to this invention) continue to provide acceptable performance with ambient cure conditions after one month at 50° C., simulating one year at room temperature. Those samples prepared at pH 3 to 4 are clearly inferior (comparative examples Comp 2 and Comp 3, not prepared according to the invention). The comparative samples giving poor results had 59 and 73% of the alcohol in the silanes released by hydrolysis; the good performing samples had 25% and 30% of the silane hydrolyzed as determined by measuring alcohol release.

Table T-2: Examination of the data in Table T-2 at 3 mole % silane shows that maintenance of pH at 5, versus 3, during synthesis, provides a superior latex as prepared. The sample prepared at pH 3 is of poor quality as prepared; the sample prepared at pH 5 gives good results. The comparative samples giving poor results had 65 and 77% of the alcohol in the silanes released by hydrolysis; the good performing sample had 24% of the silane hydrolyzed as determined by measuring alcohol release.

Data in this table is also compared with the examples for 5 mole % in Table T-1, wherein the data shows the benefit of maintaining pH near 7 during the synthesis. In Examples 1-13, it is shown that a desirable level of hydrolysis during synthesis is above 10% and less than about 60% for the compositions used, which contained up to 3 mole % silane. In Examples 14-16, the samples giving good results were hydrolyzed to about 24 to 30% as measured by alcohol released; the poor performing samples had about 59 to 77% of the silane hydrolyzed, as determined by alcohol release. It is not unreasonable that the actual concentration of hydrolyzed silane is a more accurate measure of stability and performance than is the percent fraction of the (variable) amount of silane present. At higher levels of percent incorporation of silane, less hydrolysis (as a percent of silane present) is needed to reach the same desirable absolute concentration of silanols, when compared to hydrolyzing silane present at a lower % level. The exact concentration of silanols desired cannot be precisely calculated, because there are too many variables to be considered in the end use conditions.

Applications. In one embodiment of the invention, a suitable coalescent system for the silylated latexes has been found to be 2% dipropylene glycol butyl ether plus 4% 2-(2-butoxyethoxy)ethyl acetate based on the total weight of the latex including water. The formulation can be drawn down on zinc phosphate-treated steel or thermoplastics (for making a free film) to a dry thickness of about 1 mil (25 µm) and cured at ambient conditions or at elevated temperature, for various times.

Freshly synthesized latexes were allowed to remain at room temperature for at least 24 hours, usually 2 to 3 days, and never more than 7 days before the samples were taken for "unaged" testing.

A small sample of latex was mixed with 2% dipropylene glycol butyl ether containing 4% 2-(2-butoxyethoxy)ethyl acetate based on the total weight of the latex including water. It was allowed to stand for 30 minutes. It was drawn down on a phosphated steel panel to give a dry film thickness of approximately 1 mil by using wire-wound rod, number 24 (from The Gardner Company.) This coating rod gives a wet film thickness of approximately 2.5 mil.

Coating films were tested after they were cured under ambient conditions for a certain time—usually 7 days and 30 or 40 days. In some cases they were baked at 120° C. for 20 minutes before testing or before further ambient cure then testing. Baking can represent some end use conditions where heat is acceptable, and it also causes faster curing (formation of a cross-linked polymer network) than ambient curing. This is useful for an understanding of theoretical limits of whether and how much a system can cure with the ambient temperature limitation removed.

Characterization of Silylated Acrylic Latexes and Properties of Coatings

Gel content: An accurately weighed (±0.1 mg) sample of coating films was placed in a fine wire cage in a Soxhlet extractor, and extracted with refluxing acetone for 8 hours. The loss of weight from the coating sample was measured accurately, with the gel content calculated according to:

Gel Content (%)=$(1-\Delta W/W_0) \times 100$ where:
$W_0$ is the initial weight of coating sample, and
$\Delta W$ is the weight lost during solvent extraction.
If the film was brittle and fragmented into small pieces, as with over-cross-linked films, gel content could not be measured because the film was incompletely retained by the mesh. This procedure is based on ASTM D2765-95.

MEK resistance: Double rubs according to ASTM D 4752-87, modified to continue rubbing until the substrate was exposed, even if the number of double rubs was greater than the value of 50 as specified in the ASTM method.

Spot tests: This test was performed according to ISO 2812-1974. A one inch square piece of filter paper was placed on the film. Eight drops of solvent was added and the film was covered with a watch glass. In the case of acetone tests, the watch glass was removed after two minutes and the film wiped with a soft tissue paper. The result was rated from 1 to 5, with 1 being complete removal, 2 having substantial spots removed, and 5 being no effect. In the case of MEK, the watch glass was removed after 30 minutes and the specimen observed without wiping.

Measurement of alcohol of hydrolysis released during the latex synthesis or after completion of synthesis: A trap-to-trap (T-T) distillation apparatus was employed to separate the latex solids from the volatile components. The apparatus consisted of a 250 mL flask, a receiving tube, and connecting U-tube with a stopcock outlet at the bend of the U-tube. Sample size used was 7 to 10 grams, typically 8 grams. The distillation procedure included 4 major steps:

1. Pre-freeze: The sample was frozen by rotating the sealed sample flask in dry ice. A frozen thin coating (shell) of sample on the flask wall was formed that ensured efficient vapor flow from sample to condenser during the subsequent distillation. This markedly speeds up the distillation owing to the higher surface area of the frozen latex.
2. Deep freeze: The sample flask was attached to the distillation apparatus, and the sample flask was partly immersed in liquid nitrogen to cool it further in preparation for the trap-to-trap distillation. The system was sealed to outside air during this procedure.
3. Vacuum: The distillation system was evacuated with a mechanical pump to a pressure of approximately 0.05 mm Hg while the sample was maintained at liquid nitrogen temperature.
4. Distillation: The system was closed (under full vacuum) and the liquid nitrogen bath was removed from the sample flask and moved to the receiving tube. As the sample slowly warmed, volatiles evaporated and condensed in the cold receiving tube. The distillation was considered complete when the sample was a dry, white powdery solid.

A gas chromatograph (Hewlett Packard 5890 series II) equipped with a capillary column packed with cross-linked phenyl/methyl siloxane (DB5, Agilent) and FID detector was used to analyze the distillate samples. GC-MS spectrometric techniques were used to identify the separated species. To determine quantitatively the content of alcohol in liquid distillate samples, a weighed amount of 2,4-dioxane was added as internal standard after the distillation was complete.

While the invention has been described as above, many modifications may be made to adapt a particular situation or material to the teachings of the invention without departing from the essential scope thereof.

TABLE T1-A

Synthesis of 5 Mole % Silylated Latexes

| Working Example | Composition mole % of silane | Buffer NaHCO3 wt. % | Buffer NaHCO3, gms. | pH profile - pH measured at time t in minutes | | | | | | Coagulum wt % |
|---|---|---|---|---|---|---|---|---|---|---|
| | | | | t = 0 | t = 15 | t = 75 | t = 135 | t = 195 | t = 195-225 | |
| Comp 2 | 5% A-151 | 0 | 0 | — | 4-5 | 4 | 4 | 3-4 | — | 1.2 |
| Comp 3 | 5% A-151 | 0 | 0 | — | 4-5 | 4 | 4 | 3-4 | — | 2.4 |
| 14 | 5% A-151 | 0.67 | 1 | 8-8.5 | 8.5 | 6.5 | 6.5 | 7 | 7 | 0.7 |
| 15 | 5% A-151 | 0.67 | 1 | 8.5-9 | 7 | 7 | 7 | 7 | 7 | 1.8 |

TABLE T1-B

Characterization and Test Results from Freshly Prepared 5 Mole % Silylated Latexes

| Working Example | Composition mole % of silane | Accelerated age of SAL, @ 50 C. months. | viscosity, μ cS | % ROH released | MEK Rubs 7 day | spot test acetone, 7 day | MEK, 7 day | gel content % |
|---|---|---|---|---|---|---|---|---|
| Comp 2 | 5% A-151 | 0 | 35 | 73 | 25, 100, 25, 30, 160 | 4-5 | 1 | very brittle |
| Comp 3 | 5% A-151 | 0 | 29 | 59 | 30, 75, 25, 40, 130 | 4-5 | 2 | 89.6 (brittle) |
| 14 | 5% A-151 | 0 | 31 | 25 | 80, 290, 430, 160 | 5 | 4 | 74.2 |
| 15 | 5% A-151 | 0 | 49 | 30 | 140, 390, 470, 290 | 4-5 | 4 | 76.4 |

TABLE T1-C

Test Results from 5 Mole % Silylated Latexes Aged One Half Month at 50 Degrees Celsius and with No Baking

| Working Example Number | Composition mole % of silane | Accelerated age of SAL, @ 50 C. mon. | viscosity, μ cS | ROH released % | MEK rubs 7 day | spot test acetone, 7 day | MEK, 7 day | gel content % |
|---|---|---|---|---|---|---|---|---|
| Comp 2 | 5% A-151 | 0.5 | 26 | — | 30, 30, 35 | 1 | 1 | very brittle |
| Comp 3 | 5% A-151 | 0.5 | 79 | 60 | 35, 40, 35 | 4 | 1 | very brittle |
| 14 | 5% A-151 | 0.5 | 21 | 29 | 55, 70, 70 | 5 | 1 | 83.1 |
| 15 | 5% A-151 | 0.5 | 34 | 35 | 40, 60, 55, 90 | 4-5 | 1 | 83.5 |

TABLE T1-D

Test Results from 5 Mole % Silylated Latexes Aged One Month at 50 Degrees Celsius and with No Baking

| Working Example Number | Composition mole % of silane | Accelerated age of SAL, @ 50 C. mon. | viscosity, μ cS | ROH released % | MEK rubs 7 day | spot test acetone, 7 day | MEK, 7 day | gel content % |
|---|---|---|---|---|---|---|---|---|
| Comp 2 | 5% A-151 | 1 | ND* | — | 30, 25, 23 | 1 | 1 | very brittle |
| Comp 3 | 5% A-151 | 1 | ND* | — | | | | (gel) |
| 14 | 5% A-151 | 1 | ND* | 32 | 35, 70, 50 | 4 | 1 | 88 |
| 15 | 5% A-151 | 1 | ND* | 38 | 60, 60 | 4 | 1 | 86.5 |

*Not Determined

TABLE T2-A

Synthesis Conditions for 3 mole % latex

| Working Example | Composition mole % of silane | Buffer NaHCO3 wt. % | Buffer NaHCO3, gms. | pH profile - pH measured at time t in minutes | | | | | | Coagulum wt % |
|---|---|---|---|---|---|---|---|---|---|---|
| | | | | t = 0 | t = 15 | t = 75 | t = 135 | t = 195 | t = 195-225 | |
| Comp 4 | 3% A-151 | 0 | 0 | 5 | 5 | 4 | 4 | 3 | 3 | 2.3 |
| Comp 5 | 3% A-151 | 0 | 0 | 5-4 | 4 | 4 | 4 | 4-3 | 3 | 1.3 |
| T16 | 3% A-151 | 0.13 | 0.2 | 8.5 | 6 | 5-5.5 | 5 | 5 | 5 | 1.3 |

TABLE T2-B

Results from Testing Freshly Prepared 3 Mole % Latexes with No Baking

| Working Example # | Composition mole % of silane | Accelerated age of SAL, @ 50 C. months. | viscosity, μ CS | % ROH released | baking | MEK Rubs 7 day | MEK Rubs 30 day | spot test acetone, 7 day | MEK, 7 day | gel content % |
|---|---|---|---|---|---|---|---|---|---|---|
| Comp 4 | 3% A-151 | 0 | ND* | 77 | none | 12 | 18 | 4-5 | 1 | 84.6 (brittle) |
| Comp 5 | 3% A-151 | 0 | ND* | 65 | none | 16 | 20 | 4-5 | 1 | very brittle |
| 16 | 3% A-151 | 0 | ND* | 24 | none | 25 | 20, 20, 75 | 4-5 | 4-5 | 77.8 |

*Not Determined

What is claimed is:

1. A process for the preparation of a one-pack, hydrolysable vinyl silane modified (meth)acrylic latex interpolymer composition that is shelf-stable for at least one year at room temperature after natural aging comprising the steps:
    a) preparing a mixture of water, surfactant and buffer which ranging in concentration of 0.4 to 0.7 weight percent of the aqueous phase to provide an initial pH in the range above 8 and heating to the reaction temperature;
    b) preparing a mixture of 1 to 5 mole percent vinylalkoxysilane and (meth)acrylic monomer wherein the vinylalkoxysilane is selected from the group consisting of vinyltriethoxysilane and vinylmethyldiethoxysilane;
    c) adding the polymerization initiator to the mixture of step (a);
    d) adding a portion of the mixture of step (b) and additional polymerization initiator to the mixture of step (c) and allowing the polymerization reaction to run at the reaction temperature;
    e) adding continuously the remainder of the mixture of step (b), and additional initiator the mixture of step (d) and maintaining the pH of the aqueous phase in the range above 6.5 by adding additional buffer;
    f) allowing the polymerization reaction to run for the mixture of step (e) and simultaneously, hydrolyzing the silane in the mixture of step (e) to release from greater than 19 percent to no more than 60 percent alcohol;
    g) incorporating the hydrolyzed silane of step (f) into the polymer;
    h) adding additional polymerization initiator to complete the polymerization reaction; and
    i) adjusting the pH of the hydrolysable vinyl silane modified (meth)acrylic latex interpolymer composition of step (h) in the range above 6.5 by adding a buffer, wherein the mixture of step (h) has, after aging for at least one year at room temperature and then applying to a metal panel and curing for 7 days at room temperature in the absence of an added catalyst, at least 75 methyl ethyl ketone double rubs according to ASTM D 4752-87.

2. The process of claim 1, wherein the polymerization initiator is a redox initiator.

3. The process of claim 1, wherein the polymerization initiator is a thermal initiator.

4. The process of claim 3, wherein the polymerization initiator is selected from the group consisting of peroxides, azo compounds, inorganic persulfates, t-butyl peracetate, isopropyl peroxycarbonate and combinations thereof.

5. The process of claim 2, wherein the redox initiators are combinations of two or more components that react chemically to form free radicals.

6. The process of claim 2, wherein the redox initiators are selected from the group consisting of persulfate bisulfite, chlorate-bisulfite, peroxide-iron and persulfate-mercaptan and combinations thereof.

7. The process of claim 1, wherein the hydrolysable vinyl silane is vinyltriethoxysilane.

8. The process of claim 1, wherein the (meth)acrylic monomer is selected from the group consisting of methyl methacrylate, butyl acrylate and methacrylic acid.

9. The process of claim 1, wherein the (meth)acrylic monomer contain up to 20 weight percent of at least one vinyl organic comonomer selected from the group consisting of vinyl acetate, vinyl propionate, vinyl neodecanoate and styrene.

10. The process of claim 1, wherein the buffer is sodium bicarbonate.

11. The process of claim 1, wherein the pH of the aqueous phase is maintained between 6.5 and 8.5.

* * * * *